(12) United States Patent
Huey et al.

(10) Patent No.: US 9,307,308 B2
(45) Date of Patent: Apr. 5, 2016

(54) DYNAMICALLY FORMED ACOUSTIC VOLUME

(71) Applicant: Apple Inc., Cupertino, CA (US)

(72) Inventors: Jason J. Huey, San Francisco, CA (US); Alvin J. Hilario, Los Altos, CA (US); Kevin M. Keeler, Los Gatos, CA (US); Ping Zhao, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 37 days.

(21) Appl. No.: 14/276,967

(22) Filed: May 13, 2014

(65) Prior Publication Data

US 2015/0334479 A1    Nov. 19, 2015

(51) Int. Cl.
*H04M 1/02* (2006.01)
*H04R 1/02* (2006.01)
*H04R 31/00* (2006.01)

(52) U.S. Cl.
CPC .................. *H04R 1/02* (2013.01); *H04R 31/00* (2013.01); *H04R 2201/029* (2013.01); *Y10T 29/49007* (2015.01); *Y10T 29/49572* (2015.01)

(58) Field of Classification Search
CPC ........................................................ H04M 1/02
USPC ........................................................ 181/182
See application file for complete search history.

(56) References Cited

U.S. PATENT DOCUMENTS

| | | | | |
|---|---|---|---|---|
| 4,268,718 A * | 5/1981 | Clark, Jr. | ...................... | 381/332 |
| 6,430,297 B1 * | 8/2002 | Nakamura | ..................... | 381/345 |
| 6,522,759 B1 * | 2/2003 | Mori | .............................. | 381/150 |
| 7,019,737 B1 * | 3/2006 | Asai et al. | ...................... | 345/211 |
| 7,525,794 B2 * | 4/2009 | Kwong et al. | ............ | 361/679.15 |
| 8,005,517 B2 * | 8/2011 | Kang et al. | ................ | 455/575.1 |
| 8,259,930 B2 * | 9/2012 | Kawasaki et al. | ......... | 379/433.04 |
| 8,456,847 B2 * | 6/2013 | Hwang et al. | ................. | 361/730 |
| 8,971,974 B2 * | 3/2015 | Weaver, III | ................ | 455/575.8 |
| 9,055,143 B2 * | 6/2015 | Kim | | |
| 2009/0074400 A1 * | 3/2009 | Machida et al. | .............. | 396/448 |
| 2012/0002090 A1 * | 1/2012 | Aoki et al. | ..................... | 348/297 |
| 2014/0069736 A1 * | 3/2014 | Freshman et al. | ............ | 181/182 |
| 2015/0085433 A1 * | 3/2015 | Kim | ......................... | 361/679.01 |

* cited by examiner

*Primary Examiner* — Forrest M Phillips
(74) *Attorney, Agent, or Firm* — Downey Brand LLP

(57) ABSTRACT

This application relates to methods and apparatus for waterproofing an electronic device having an audio output. More particularly a method for dynamically forming an acoustic volume of air for a speaker component is disclosed. The dynamically formed acoustic volume creates a sealed volume of air that prevents moisture from entering a portion of the device that includes moisture sensitive components. By dynamically forming the acoustic volume during a blow forming operation, the acoustic volume can utilize unused space within the electronic device in a highly efficient manner by occupying small areas of unused space that would otherwise go unused.

21 Claims, 6 Drawing Sheets

DYNAMICALLY FORMED ACOUSTIC VOLUME

FIELD

The described embodiments relate generally to methods and apparatus for forming an acoustic volume in an electronic device. More particularly, the present embodiments relate to dynamically forming an acoustic volume that conforms to other operational components within the electronic device.

BACKGROUND

Electronic devices often contain ports and audio openings for enabling the transmission of data and/or audio into and out of a housing associated with the electronic device. Unfortunately, these openings leave the devices vulnerable to water damage. Although waterproof meshes can be arranged to mitigate entry of water through these openings, moisture in the form of vapor can still pass substantially uninhibited through the openings. When the water vapor condenses inside the device, the condensed water can cause damage to moisture-sensitive components disposed within the housing. Audio components cause a particularly challenging problem, as they often require a large volume of air to enhance audio generated by an audio component. Since the volume of air must have a pathway out of the housing of the portable electronic device, this leaves a large internal volume within the device that should be made at least water resistant in the case of entry of moisture into the housing.

SUMMARY

This paper describes various embodiments that relate to waterproofing an electronic device.

An electronic device is disclosed. The electronic device includes at least the following: a housing that defines an internal volume accessible by an opening, where the opening is substantially smaller than the internal volume; a component disposed within the internal volume; and a moisture barrier that includes an expandable membrane that in an initial state has a size compatible with the opening and is processed into a final state that substantially conforms to interior surfaces of the internal volume and provides a vibration buffer to components disposed within the internal volume.

Another electronic device is disclosed. The electronic device includes at least the following: a housing, that includes a first compartment accessible by way of an opening in the housing, and a second compartment accessible from the opening by way of the first compartment; an operational component disposed within the second compartment; and a moisture resistant membrane disposed within the second compartment and coupled with an exterior surface of the first compartment, the moisture resistant membrane preventing moisture from the first compartment from contacting the operational component. A shape of the moisture resistant membrane is established by filling the moisture resistant membrane with a pressurized inflating medium until the moisture resistant membrane substantially conforms with the operational component and interior surfaces of the second compartment. Subsequent to the filling the moisture resistant membrane undergoes a curing operation that stiffens the walls of the moisture resistant membrane, thereby fixing a shape and size of the moisture resistant membrane within the second compartment.

A method for dynamically forming a speaker volume within a portable computing device is disclosed. The method includes at least the following steps: assembling substantially all components within the portable computing device housing; coupling a moisture resistant material to an exterior surface of a first compartment of the portable computing device, where an audio component is disposed within the first compartment, and the moisture resistant material and first compartment cooperate to form a vapor-tight seal that prevents moisture from passing between the first compartment and a second compartment that encloses a moisture sensitive operational component; inflating the moisture resistant material by inputting pressurized gas into the first compartment until the moisture resistant material expands to fill a substantial portion of unused space in the second compartment; and curing the moisture resistant material until it hardens to form a fixed size back volume of air for the audio component.

Other aspects and advantages of the invention will become apparent from the following detailed description taken in conjunction with the accompanying drawings which illustrate, by way of example, the principles of the described embodiments.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Figure 1A:
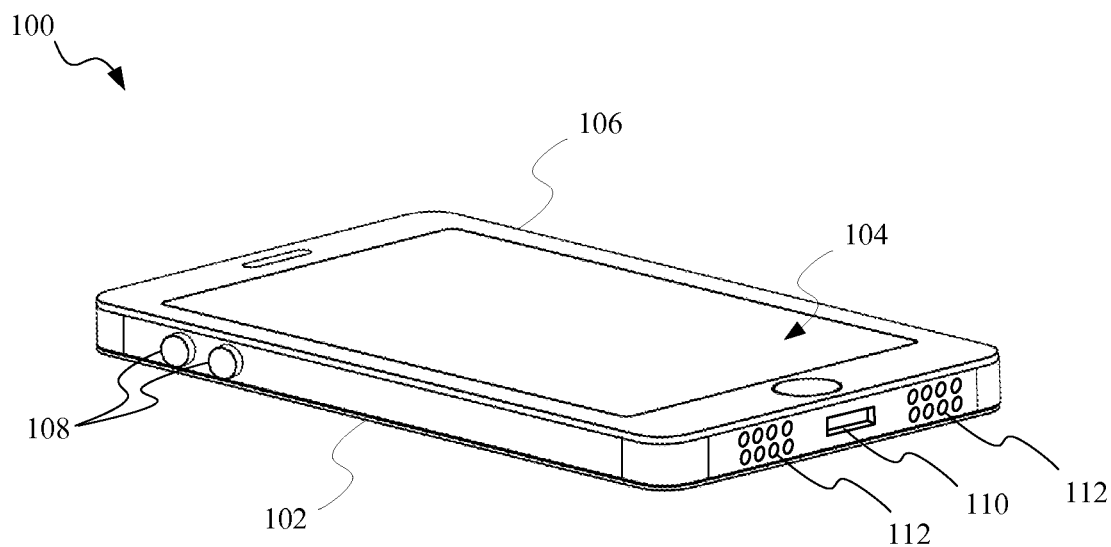
FIGS. 1A-1B show perspective views of an exemplary portable electronic device.

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

Audio ports, audio jack openings and input/output (I/O) port openings can each create easy ingress pathways for water in many portable electronic devices. When an interior portion of the device is substantially open to any water or vapor entering a housing of the device, water or vapor can ingress through these ports causing water damage to any of a number of moisture sensitive operational components. Existing waterproofing techniques include applying waterproof coatings to particularly sensitive components or encapsulating those components in adhesive. These types of methods can be time-consuming operations and for this reason are generally only utilized to protect particularly vulnerable portions of the portable electronic device, leaving other portions of the portable electronic device susceptible to damage. Alternatively, portions of the device located adjacent to the openings can be sealed off so that moisture entering the portable electronic device as vapor is not able to spread to other portions of the device not directly related to the openings. Unfortunately, generating sealed boundaries that enclose components associated with the opening can substantially reduce an amount of available space within the housing.

Speaker modules in particular can benefit from being positioned adjacent to a large volume of enclosed air. This is primarily because a large volume of air can help to increase bass or low frequency response of a speaker module. Unfortunately, the drive to keep devices small can preclude inclusion of a volume of enclosed air having a sufficiently large volume to achieve a desired range of audio response. One solution to this problem is to form a discrete interior volume of air within the device housing utilizing extra space available between internal operational components. Installation of such a volume can be problematic because the discrete volume of air would in some cases occupy area both above and below various operational components. This geometry would frustrate conventional assembly techniques since standard top down installation would be problematic given the complex geometries involved. One way to overcome this problem is to install a substantial portion of the operational components within the device housing and then conduct a blow forming operation that dynamically forms an acoustic volume that can assume the complex geometries needed to fill the unused space within the device housing. The blow forming operation involves inflating an amount of pliable material to fill the unused areas in the device housing. In this way, the pliable material can act as a moisture resistant membrane, growing larger as more and more pressurized inflating medium is forced into the moisture resistant membrane. In some embodiments, the pliable material can be a thermoset plastic having sufficient durability to maintain its shape and avoid puncture during the blow forming operation. Some appropriate materials for use as the pliable material can include high-density polyethylene, low-density polyethylene, polypropylene, polyvinyl chloride and polyethylene terephthalate. During expansion of the pliable material, interior geometries of the operational components within the housing act to define a shape that the pliable material assumes. In this way, the pliable material can conform to the various operational components within the device housing and create an acoustic volume that maximizes available space within the device housing without exposing moisture sensitive components to foreign contaminates such as water or water vapor.

In one specific embodiment, a speaker module can be arranged in a vapor-tight portion of a portable electronic device adjacent to audio ports that allow audio waves to exit a device housing of the portable electronic device. In addition to allowing the audio waves to exit the device, the vapor-tight portion can also receive vapor from the ambient environment through the audio ports; however, the vapor is contained and prevented from migrating to other more moisture sensitive locations in the device housing by the vapor-tight portion of the portable electronic device. It should also be noted that the speaker module can be positioned adjacent to an amount of pliable material suitable for use in a blow-forming operation. The pliable material can be preformed along a surface of an interior wall that defines at least a portion of the vapor-tight portion of the device housing. In some embodiments, a number of fasteners along the lines of screws can be utilized to affix the pliable material to the interior wall. During the blow-forming operation, the pliable material expands and conforms with components disposed within the portable computing device housing. After the pliable material fills the designated volume within the housing, a curing treatment can be applied to fix a position of the pliable material within the electronic device. The curing treatment can cause the pliable material defining the acoustic volume to become more rigid and maintain a position of the flexible material within the device housing. In this way, unused internal spaces within the electronic device can be utilized by the acoustic volume without having to worry about water-sensitive components being exposed to moisture that ingresses through the audio ports.

These and other embodiments are discussed below with reference to FIGS. 1A-6; however, those skilled in the art will readily appreciate that the detailed description given herein with respect to these figures is for explanatory purposes only and should not be construed as limiting.

Figure 1B:
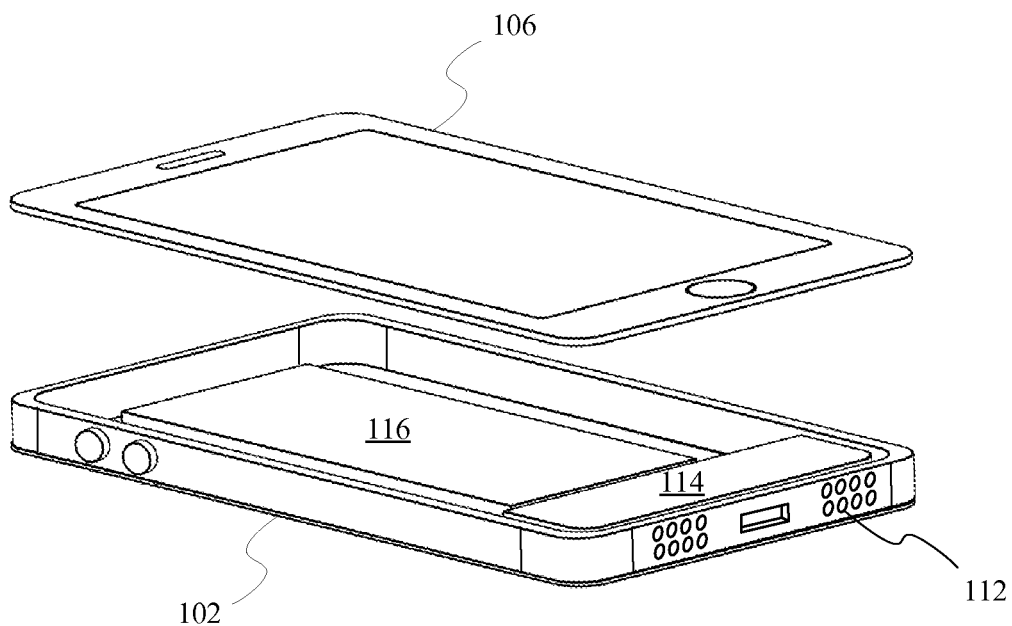

FIGS. 1A-1B show an exemplary electronic device 100. Electronic device 100 can include housing 102 that encloses any number of electronic device components including for example display assembly 104. Display assembly 104 can be coupled to protective cover 106 and have associated circuitry and sensors operable to present a user with a touch sensitive user interface along an outside surface of protective cover 106. Housing 102 can also include various openings for accommodating components such as buttons 108, and input/output (I/O) connector port 110. Audio ports 112 can facilitate the transmission of audio signals from a speaker module disposed within housing 102. Unfortunately, in addition to enabling the transmission of audio signals out of housing 102, audio ports 112 can allow undesirable foreign matter or contaminates to enter housing 102. In particular, when electronic device 100 is submerged or even exposed to a liquid, the liquid can find its way into housing 102 through one of the many openings, including audio ports 112. Even when the openings are protected by a waterproof mesh, moisture can enter in the form of vapor through the waterproof mesh opening and subsequently condense within housing 102. Condensation of the vapor inside the housing can cause corrosion and/or short-circuiting of sensitive components or connectors within the device.

FIG. 1B shows an internal perspective view of housing 102 with protective cover 106 removed. For exemplary purposes only, two components are shown within housing 102: speaker assembly 114, and battery 116. It should be understood that many other electrical components and support structures compete for space within housing 102 but for clarity, this example is limited to two components. Speaker assembly 114 can be substantially larger than speaker circuitry or components necessary to drive the speaker assembly because speaker assembly 114 generally includes an enclosed volume of air (sometimes referred to as a back volume) for enhancing low frequency audio produced by the speaker circuitry. As a result of this requirement for the enclosed volume of air, speaker assembly 114 can take up a substantial amount of room within housing 102. Distribution of this volume of air throughout housing 102 can substantially reduce the size of speaker assembly 114 so that a size of speaker assembly 114 is closer to a size of the audio components that produce the sound waves. By substantially reducing a size of speaker assembly 114, other components such as battery 116 can increase in size. Alternatively, an overall size of housing 102 can be reduced with the additional space available due to the reduced speaker assembly size to provide a more appealing form factor for electronic device 100.

Figure 2:
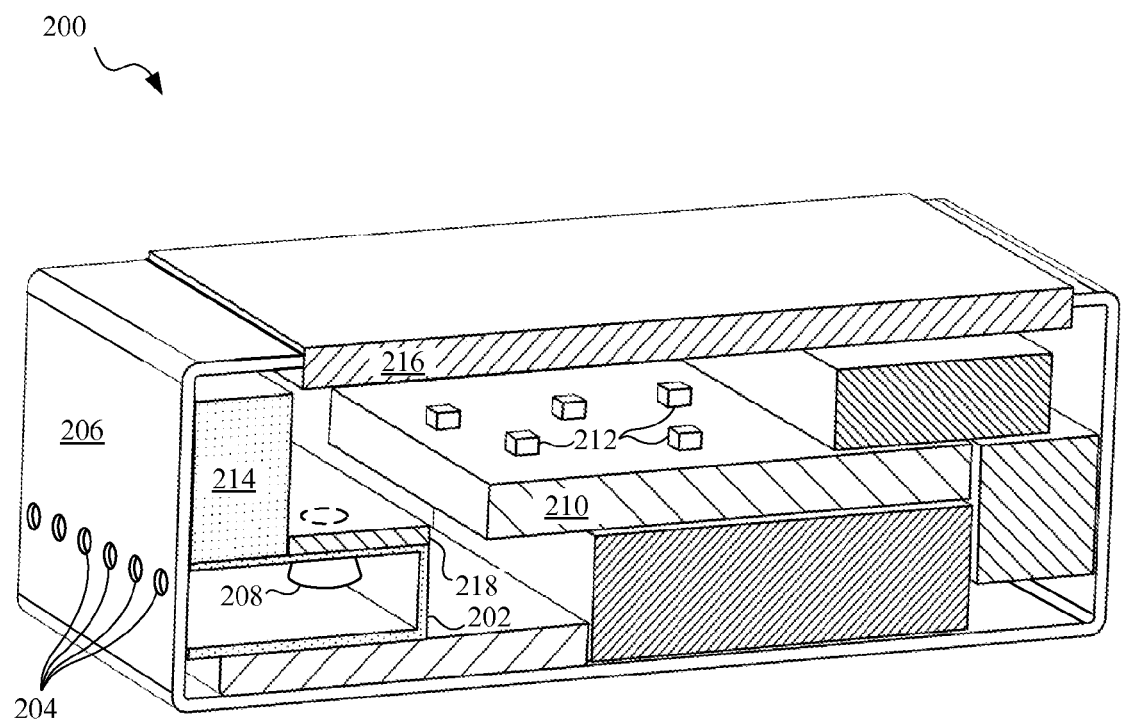
FIG. 2 shows a partial cross-sectional perspective view of an electronic device suitable for use with the described embodiments.

FIG. 2 shows a partial cross-sectional perspective view of an electronic device 200 suitable for use with the described embodiments. Electronic device 200 includes a number of electrical components dispersed throughout electronic device 200. In some cases, large gaps are present between the electrical components. Electronic device 200 includes a vapor-tight compartment 202 with acoustic ports 204 disposed through an outer wall of housing 206 that allow audio signals from audio component 208 to be transmitted outside of housing 206. The vapor-tight compartment 202 can retains any moisture that enters housing 206 through acoustic ports 204 by preventing the moisture from accessing water sensitive components disposed within other portions of housing 206. It should be noted that while audio component 208 is displaced away from acoustic ports 204 in FIG. 2, in some embodiments audio component 208 can be disposed just behind acoustic ports 204 to reduce a size of vapor-tight compartment 202. While vapor-tight compartment 202 does provide a convenient size for integrating it with other volumetrically substantial components, it is generally too small to provide sufficient space for an acoustic volume sized to enhance low frequency audio signals generated by audio component 208. Housing 206 can also enclose printed circuit board (PCB) 210. PCB 210 can include a number of small protrusions taking the form of moisture sensitive components 212, which can be components along the lines of cooling stack structures and electromagnetic interference (EMI) shielding cans. Housing 206 encloses a number of other modules including for example docking assembly 214 and display assembly 216. Pliable material 218 can be disposed along an outside portion of a wall by which audio component 208 is disposed. While pliable material is depicted as being embodied as a substantially flat sheet of material it should be understood that pliable material 218 can be shaped to help bias a shape that pliable material 218 assumes during a blow forming operation. For example, more of the material could be disposed upon one side than the other to encourage the material to expand in a particular direction.

Figure 3A:
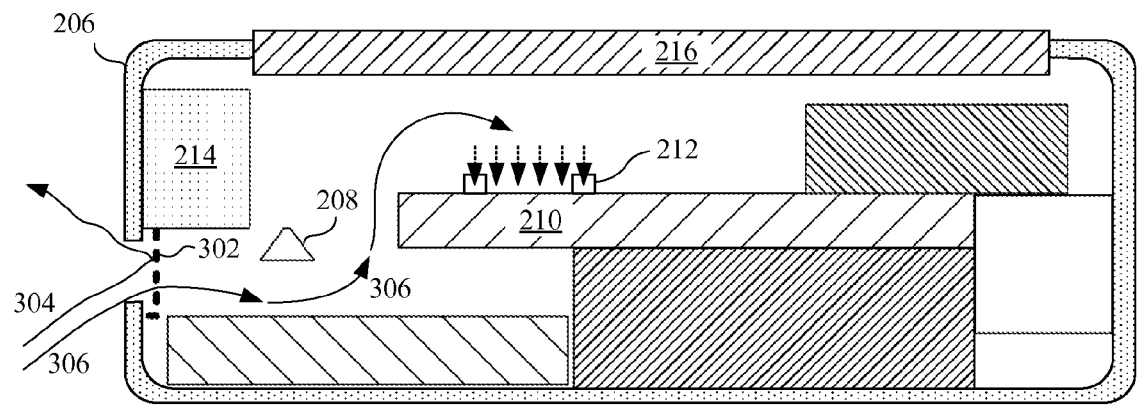
FIGS. 3A-3B show how a dynamically formed acoustic volume can prevent moisture entering an electronic device as vapor from damaging moisture sensitive components disposed within the electronic device.
Figure 3B:
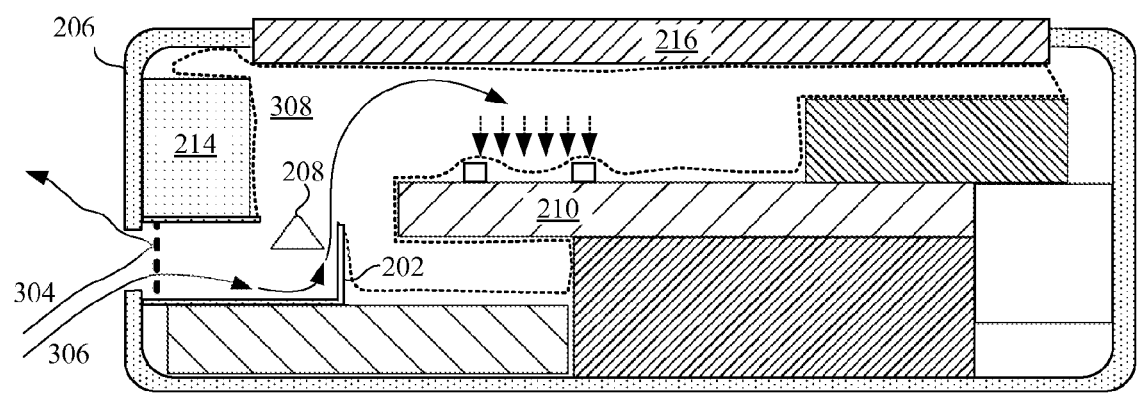

FIGS. 3A-3B show how exposure of electronic device 200 to liquids and gases can affect moisture sensitive components of electronic device 200. FIG. 3A depicts electronic device 200 without vapor-tight compartment 202. By allowing audio component 208 to propagate sound waves throughout a cavity defined by inside surfaces of housing 206, audio performance can be enhanced. Unfortunately, while liquid resistant mesh 302 can prevent entry of liquids 304 through liquid resistant mesh 302, moisture in the form of vapor 306 can still enter into housing 206 and condense within housing 206. The smaller vapor particles of vapor 306 are simply too small for liquid resistant mesh 302 to block. For example, FIG. 3A shows how liquid 304 incident to liquid resistant mesh 302 can be deflected and prevented from entering housing 206; however, vapor 306 enters through liquid resistant mesh 302 and then condense over moisture sensitive components 212 disposed on PCB 210. Condensation of vapor 306 can cause numerous problems for both moisture sensitive components 212 and other moisture sensitive components dispersed throughout housing 206. FIG. 3B shows another embodiment of electronic device 200, which includes both dynamically formed acoustic volume 308 that extends into small areas of electronic device 200 to increase a volumetric size of an acoustic volume for audio component 208 and vapor-tight compartment 202. Dynamically formed acoustic volume 308 and vapor-tight compartment 202 cooperate to protect moisture sensitive components from being exposed to condensed moisture, while also providing a relatively large volume of air for enhancing audio produced by audio component 208. As depicted, when vapor 306 enters dynamically formed acoustic volume 308 and condenses over moisture sensitive components 212 the walls defining dynamically formed acoustic volume 308 prevent the condensed moisture from contacting moisture sensitive components 212.

Figure 4A:
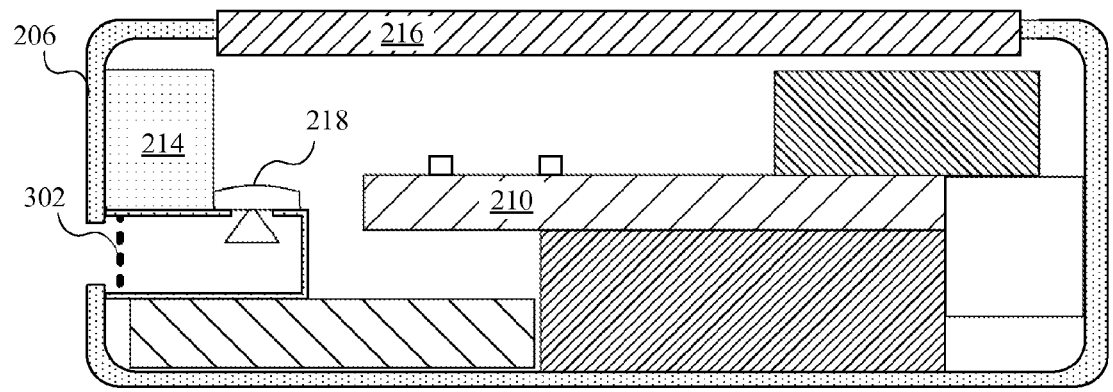
FIGS. 4A-4C show a series of steps for dynamically forming an acoustic volume.
Figure 4B:
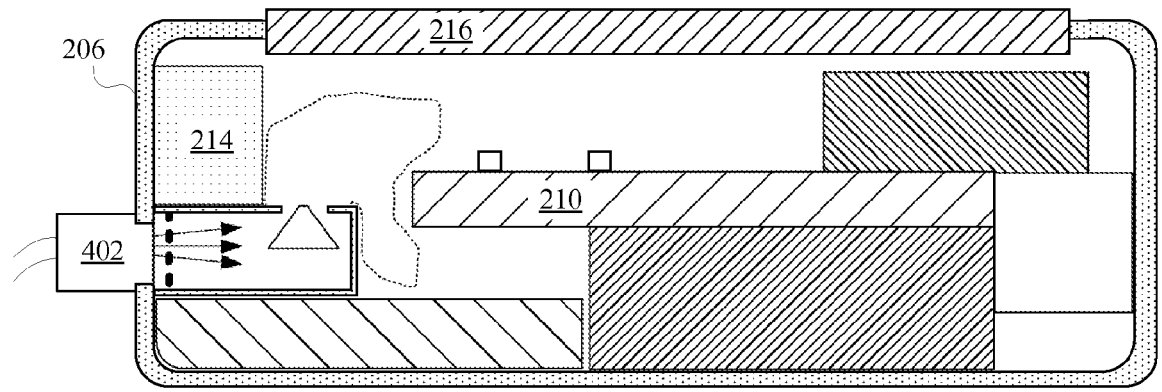
Figure 4C:
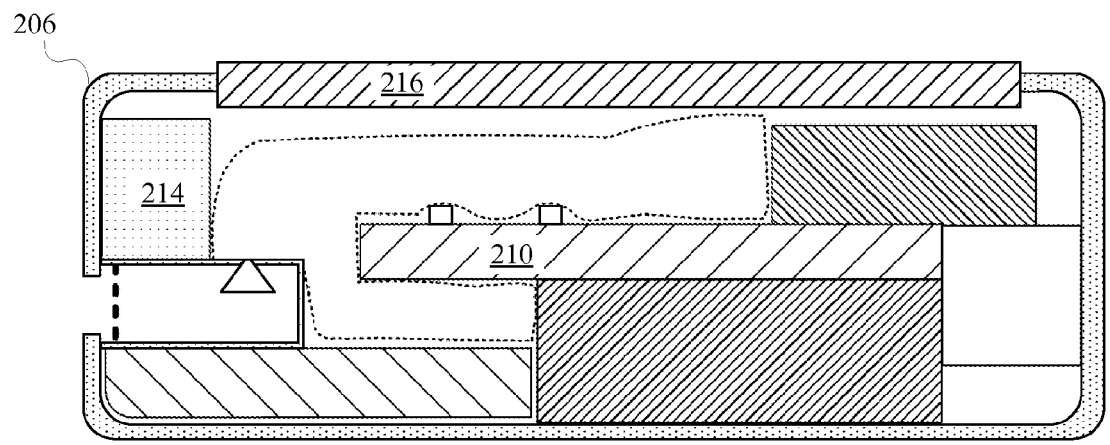

FIGS. 4A-4C show a number of cross-sectional views of electronic device 200 during a blow forming operation. In FIG. 4A pliable material 218 is shown disposed along a sidewall of vapor-tight compartment 202. Pliable material 218 cooperates with sidewalls of vapor-tight compartment 202 to prevent moisture from spreading outside vapor-tight compartment 202. In some embodiments, pliable material 218 can form a substantial portion of one of the sidewalls that form vapor-tight compartment 202. In other embodiments, pliable material 218 can be disposed over a portion of a sidewall of vapor-tight compartment 202 that includes a series of perforations sized to allow audio signals to pass through the sidewall. FIG. 4B shows how a device 402 can be arranged at an opening into housing 206 to blow an inflating medium (along the lines of air or inert gas) into vapor-tight compartment 202, causing pliable material 218 to expand and begin filling spaces between other components disposed within housing 206. In some embodiments, device 402 can be an air compressor that engages housing 206 in a manner that causes every opening leading into vapor-tight compartment 202 to be closed. In this way, the inflating medium input into vapor-tight compartment 202 by device 402 can press out on and expand pliable material 218. FIG. 4C shows how forcing more gas into vapor-tight compartment 202 causes pliable material 218 to expand into more open areas within housing 206. A size of the cavity created by pliable material 218 can be controlled by monitoring an amount of air introduced into vapor-tight compartment 202 to achieve a desired volume of air within housing 206 for enhancing audio produced by audio component 208. A volume and/or shape of the volume of air can also be controlled by a pressure at which air is introduced into vapor-tight compartment 202. It should also be noted that when pliable material 218 encounters sharp objects such as moisture sensitive components 212 or a narrow intersection between docking assembly 214 and display assembly 216, material properties of pliable material 218 can allow pliable material 218 to conform with the obstructive operational components, thereby preventing a rupture in the pliable material and thereby allowing the volume of air to remain vapor-tight.

Figure 5:
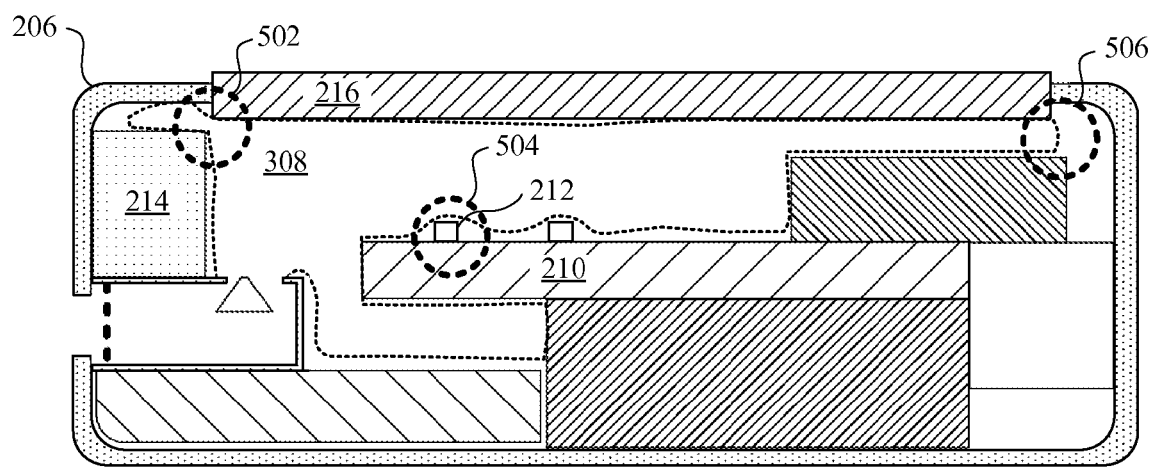
FIG. 5 shows three locations in which the pliable material forming the dynamically formed acoustic volume can be subjected to various stresses.

FIG. 5 shows three locations in which the pliable material dynamically forming acoustic volume 308 can be subjected to various stresses. In some embodiments, the pliable material can be shaped at least in part prior to installation of vapor-tight compartment 202. Location 502 shows a restricted area defined by docking assembly 214 and display assembly 216. As the pliable material approaches the restricted area, an increasing amount of back-pressure is experienced by the device that forces air or inert gas into the dynamically formed acoustic volume. This increased pressure can indicate a position and/or size of the acoustic volume that helps determine at what point the dynamically formed acoustic volume is fully formed. In some embodiments, a back-pressure profile can be created to help determine a progression of a blow forming operation. Location 504 shows how dynamically formed acoustic volume conforms around moisture sensitive component 212. In some embodiments, moisture sensitive component 212 can have sharp edges, which have the potential to punch a hole into dynamically formed acoustic 308. In some embodiments, a speed at which the acoustic volume expands can be reduced to lower an amount of stress experienced by the acoustic volume while it expands against potentially sharp or jagged objects disposed within housing 206. Finally, location 506 shows an area in which back-pressure can be reduced as the volumetric space available to the pliable material increases. In some, embodiments, this reduction in back pressure can also be utilized to anticipate contact between the pliable material and sharp corners with which the pliable material can come in contact.

Figure 6:
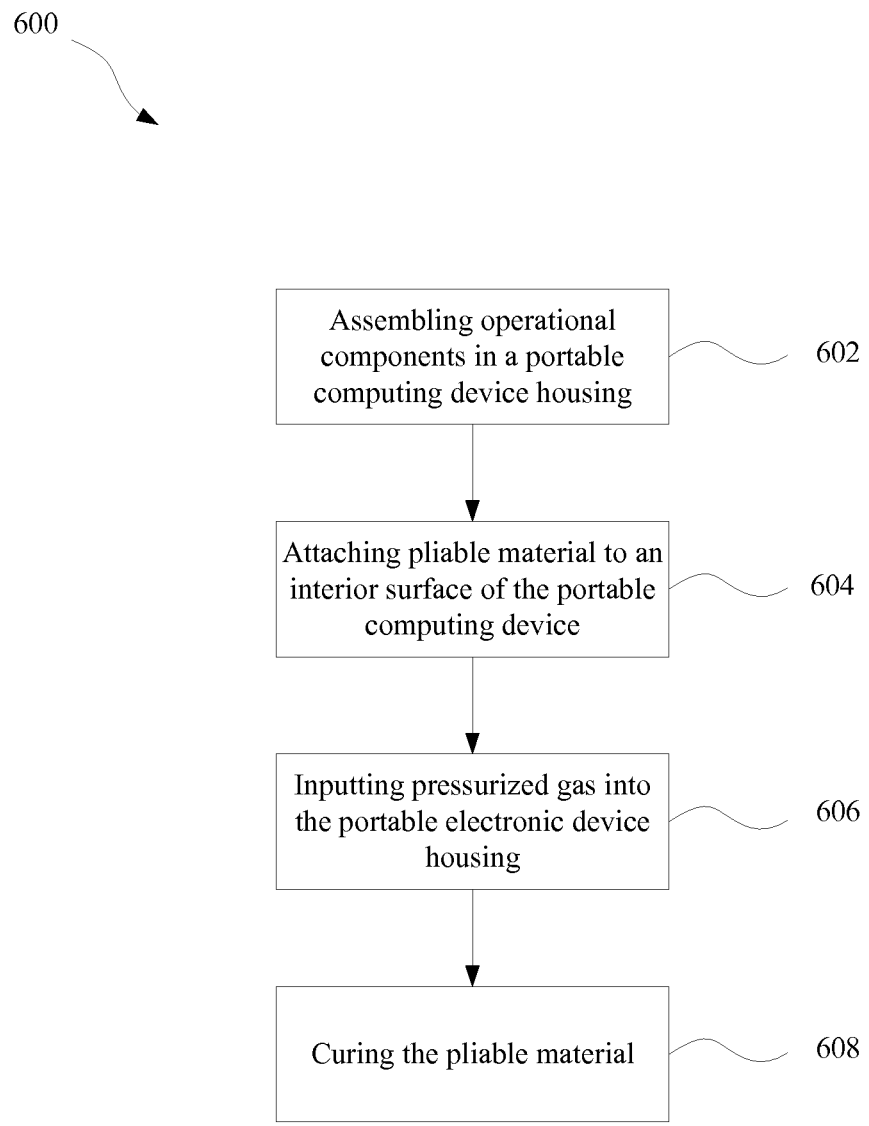
FIG. 6 shows a flow chart representing a method for assembling an electronic device having a dynamically formed acoustic volume.

FIG. 6 shows a flow chart representing a method 600 for assembling an electronic device having a dynamically formed acoustic volume. In a first step 602, most if not all operational components of the electrical device are assembled and installed within an electronic device housing. During the assembly a vapor-tight compartment is installed or in some cases integrally formed with an interior surface portion of the electronic device housing. In step 604, an amount of pliable material is adhered along an outside surface of the vapor-tight compartment. In some embodiments, the pliable material is utilized to form one of the walls of the vapor tight-compartment, while in other embodiments the pliable material covers a number of perforated openings that allow air within the vapor-tight compartment to contact the pliable material. Because audio components are positioned within the vapor-tight compartment and isolated from the other electronics, a pass-through speaker and or microphone cable can be electrically coupled to at least one other component through at least one portion of the vapor-tight compartment. For example, the vapor tight compartment can include a small opening in one of the walls defining the vapor-tight compartment, thereby allowing the wires to reach another component, such as a printed circuit board (PCB) from which the audio components can receive instructions for outputting audio to a user or transmitting information recorded by a microphone to a processor disposed upon the PCB. In some embodiments, the processor of the PCB can decode audio instructions to send to the audio component or components over the wires. Once the wires pass through the wall of the vapor-tight compartment the opening can be sealed. In some cases, an additional seal may be needed to prevent vapor from passing through the opening for the wires. In other embodiments, the wires can be wrapped in a jacket or carrier that both protects the wires from moisture exposure and helps to seal the wire opening. For example, a rubber jacket could be operative to both seal the wire opening shut and provide moisture protection to the wires.

In step 606, a sealed plug is attached to the device housing so that it overlays each of the audio ports leading into the vapor-tight compartment. After the attachment, the sealed plug delivers pressurized air or inert gas to the vapor-tight compartment and as the pressurized air is delivered, the pressure build up causes the pliable material to be pushed outward and away from the wall to which it is attached. Delivery of the pressurized air continues until the pliable material achieves a final volume suitable for providing a desired acoustic output. Determining when the final volume has been reached can be accomplished in a number of ways. For example, when a back-pressure within the device increases above a predetermined threshold the delivery of pressurized air can stop or at least be reduced to a pressure at which expansion of the pliable material ceases. The predetermined back-pressure threshold can be associated with an amount of expansion of the acoustic output that corresponds to a properly sized acoustic volume. In other embodiments, an amount of air introduced into the device can be monitored, and delivery of the pressurized air can stop when a predetermined amount of air has been delivered. In step 608, a thermal curing operation can be initiated that hardens the pliable material so that the acoustic volume can retain a desired size and shape. The temperature or duration for which the temperature during the curing operation should not be detrimental to the other components within the housing. It should be noted that in some embodiments the pliable material can be cured in other manners. For example, ultraviolet (UV) curing or chemical curing of the pliable material can also be utilized. After curing the pliable material the dynamically formed acoustic volume can be checked for leaks to ensure proper forming and desired performance of the dynamically formed acoustic volume. It should be noted that the dynamically formed acoustic volume provides an additional benefit of helping to prevent unwanted vibration of the internal components with which it comes in direct contact.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line. The computer readable medium is any data storage device that can store data which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:
1. An electronic device, comprising:
a housing comprising an internal volume accessible by an opening, wherein the opening is substantially smaller than the internal volume;
a component disposed within the internal volume; and
a moisture barrier comprising an expandable membrane that in an initial state has a size compatible with the opening and is processed into a final state that substantially conforms to interior surfaces of the internal vol- ume, by inputting an inflating medium into the expandable membrane until a size and shape of the final state is reached.

2. The electronic device as recited in claim 1, wherein the opening is an audio port.

3. The electronic device as recited in claim 2, wherein the moisture barrier prevents moisture entering the housing through the audio port from contacting the component.

4. The electronic device as recited in claim 1, wherein the moisture barrier further comprises an audio compartment disposed within the internal volume and adjacent to the opening in the housing, and wherein the audio compartment encloses an audio component and cooperates with the expandable membrane in both the initial state and the final state to prevent moisture entering the audio compartment through the opening from contacting the component.

5. The electronic device as recited in claim 1, wherein the processing further comprises:
stiffening the expandable membrane so that the shape and size of the expandable membrane is fixed, such that a fixed volume of air is enclosed.

6. The electronic device as recited in claim 1, wherein the moisture barrier provides a vibration buffer to a plurality of operational components disposed within the internal volume.

7. An electronic device, comprising:
a housing, comprising:
a first compartment accessible by way of an opening in the housing, and
a second compartment accessible from the opening by way of the first compartment;
an operational component disposed within the second compartment; and
a moisture resistant membrane disposed within the second compartment and coupled with an exterior surface of the first compartment, the moisture resistant membrane preventing moisture from the first compartment from contacting the operational component,
wherein a shape of the moisture resistant membrane is established by filling the moisture resistant membrane with a pressurized inflating medium until the moisture resistant membrane substantially conforms with the operational component and interior surfaces of the second compartment, and wherein subsequent to the filling the moisture resistant membrane undergoes a curing operation that stiffens the moisture resistant membrane, thereby fixing a shape and size of the moisture resistant membrane within the second compartment.

8. The electronic device as recited in claim 7, further comprising:
an audio component disposed within the first compartment.

9. The electronic device as recited in claim 8, wherein a first volume of air surrounded by the moisture resistant membrane is in direct contact with a second volume of air surrounded by the first compartment so that the first volume of air is operative as a back volume of air for enhancing low frequency audio produced by the audio component.

10. The electronic device as recited in claim 9, wherein the moisture resistant membrane fills a substantial portion of unused space in the second compartment.

11. The electronic device as recited in claim 9, wherein the moisture resistant barrier is formed from a thermoset plastic and wherein the curing operation is a thermal curing operation.

12. The electronic device as recited in claim 7, wherein a volume of air disposed within the moisture resistant barrier is substantially larger than a volume of air within the first compartment.

13. The electronic device as recited in claim 8, wherein the opening in the housing comprises a plurality of audio ports providing access to the first compartment through the housing;
and wherein the electronic device further comprises a liquid resistant mesh disposed across each of the plurality of audio ports of the housing.

14. The electronic device as recited in claim 8, further comprising:
a wire electrically coupling the audio component with the operational component,
wherein the operational component includes a processor that provides instructions to the audio component by way of the wire.

15. A method of dynamically forming a speaker volume within a portable computing device, the method comprising:
assembling substantially all operational components within a housing of the portable computing device;
coupling a moisture resistant material to an exterior surface of a first compartment of the portable computing device, wherein an audio component is disposed within the first compartment, and wherein the moisture resistant material and first compartment cooperate to form a vapor-tight seal that prevents moisture from passing between the first compartment and a second compartment that encloses a moisture sensitive operational component;
inflating the moisture resistant material by inputting pressurized gas into the first compartment until the moisture resistant material expands to fill a substantial portion of unused space in the second compartment; and
curing the moisture resistant material until it hardens to form a fixed size back volume of air for the audio component.

16. The method as recited in claim 15, further comprising:
electrically coupling the audio component to an operational component within the second compartment by passing a wire through a wire opening in a wall defining the first compartment.

17. The method as recited in claim 16, wherein the operational component directs an output of the audio component.

18. The method as recited in claim 15, wherein the curing comprises thermal curing.

19. The method as recited in claim 15, further comprising:
acoustically testing the cured back volume of air for leaks and proper forming.

20. The method as recited in claim 15, wherein the inputting of pressurized gas stops when a predetermined amount of back-pressure is experienced by an apparatus introducing the pressurized gas.

21. The method as recited in claim 15, further comprising:
varying a pressure of the pressurized gas during the inflating in accordance with an amount of inflation of the moisture resistant material.

* * * * *